US011588546B2

(12) United States Patent
Montgomery et al.

(10) Patent No.: US 11,588,546 B2
(45) Date of Patent: *Feb. 21, 2023

(54) MOBILE SATELLITE MODEM FOR COMBINED GEOSTATIONARY, MEDIUM AND LOW EARTH ORBIT SATELLITE OPERATION

(71) Applicants: Guy Montgomery, Potomac, MD (US); George Choquette, Germantown, MD (US); Satyajit Roy, Gaithersburg, MD (US)

(72) Inventors: Guy Montgomery, Potomac, MD (US); George Choquette, Germantown, MD (US); Satyajit Roy, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/553,155

(22) Filed: Dec. 16, 2021

(65) Prior Publication Data

US 2022/0209855 A1 Jun. 30, 2022

Related U.S. Application Data

(63) Continuation of application No. 17/136,558, filed on Dec. 29, 2020, now Pat. No. 11,233,562.

(51) Int. Cl.
*H04B 7/185* (2006.01)
*H04B 7/26* (2006.01)
*H04B 7/204* (2006.01)

(52) U.S. Cl.
CPC ..... *H04B 7/18519* (2013.01); *H04B 7/18513* (2013.01); *H04B 7/18589* (2013.01); *H04B 7/2048* (2013.01); *H04B 7/2675* (2013.01)

(58) Field of Classification Search
CPC ............ H04B 7/18519; H04B 7/18513; H04B 7/18589; H04B 7/2048; H04B 7/2675
See application file for complete search history.

(56) References Cited

U.S. PATENT DOCUMENTS 5,898,902 A 4/1999 Tuzov
7,706,754 B2 4/2010 Krasner
(Continued)

OTHER PUBLICATIONS

International search report for PCT application No. PCT/2021/062976.
(Continued)

*Primary Examiner* — Dominic E Rego
(74) *Attorney, Agent, or Firm* — Capitol City TechLaw; Jasbir Singh

(57) ABSTRACT

The present teachings include a method and computing apparatus for triggering synchronization of a satellite modem to a carrier frequency of a beam of a satellite, retrieving ephemeris information for the satellite and beam configuration information for the beam, calculating a velocity of the satellite per the ephemeris information, and adjusting the carrier frequency of the satellite modem when communicating via the beam to compensate for a doppler offset induced in the carrier frequency by the velocity. In the method, the satellite has a satellite type selected from a Geosynchronous Earth Orbit (GEO), Medium Earth Orbit (MEO) or Low Earth Orbit (LEO) type of satellite, and the satellite type is different than a satellite type of an immediately preceding synchronization.

20 Claims, 3 Drawing Sheets

(56) References Cited

U.S. PATENT DOCUMENTS

| | | | |
|---|---|---|---|
| 8,355,675 B2 | 1/2013 | Roh et al. | |
| 10,554,293 B1 | 2/2020 | Chin et al. | |
| 2005/0278116 A1 | 12/2005 | McBurney et al. | |
| 2008/0107219 A1 | 5/2008 | Oakes et al. | |
| 2009/0140924 A1 | 6/2009 | Mizuochi et al. | |
| 2010/0034137 A1 | 2/2010 | Jo et al. | |
| 2010/0117899 A1 | 5/2010 | Papadimitratos et al. | |
| 2010/0188304 A1 | 7/2010 | Clymer et al. | |
| 2010/0207814 A1 | 8/2010 | Cho | |
| 2010/0259444 A1 | 10/2010 | Kosolobov et al. | |
| 2010/0277366 A1 | 11/2010 | Terashima | |
| 2011/0001663 A1 | 1/2011 | Anand et al. | |
| 2013/0065514 A1 | 3/2013 | Whelan et al. | |
| 2014/0320341 A1 | 10/2014 | Muraki | |
| 2015/0270890 A1* | 9/2015 | Vasavada | H04B 7/195 370/326 |
| 2016/0323032 A1 | 11/2016 | Ulupinar et al. | |
| 2017/0139051 A1 | 5/2017 | Martin et al. | |
| 2020/0145977 A1 | 5/2020 | Kumar et al. | |
| 2020/0178135 A1 | 6/2020 | Yun et al. | |
| 2020/0204217 A1 | 6/2020 | Hou et al. | |

OTHER PUBLICATIONS

Zhang Shuliang et al: "A survey on space-aerial-terrestrial integrated 5G networks", Computer Networks, vol. 174, Jun. 1, 2020 (Jun. 1, 2020), p. 107212, XP055916927, Amsterdam, NL ISSN: 1389-1286, DOI: 10.1016/.comnet.2020.107212 Sections 1, 2.1.1, 3-5: figures 4-8.

* cited by examiner

MOBILE SATELLITE MODEM FOR COMBINED GEOSTATIONARY, MEDIUM AND LOW EARTH ORBIT SATELLITE OPERATION

CROSS-REFERENCE TO RELATED APPLICATIONS AND INCORPORATION BY REFERENCE

The present application is a continuation of U.S. Non-Provisional application Ser. No. 17/136,558, filed Dec. 29, 2020, which is incorporated herein by reference in its entirety.

FIELD

The present teachings disclose a modem that can perform beam selection and handover across coverage served by one or more Geostationary Earth-Orbit (GEO) satellites, an overlapping constellation of Medium Earth-Orbit (MEO) satellites, an overlapping constellation of Low Earth-Orbit (LEO) satellites or a combination thereof. The modem maintains proper operation with each satellite type based on a relative motion between the modem and the satellites.

BACKGROUND

Current satellite communication systems use modems specific to the satellite type being used. A modem, and the modem's associated ground segment, are dedicated to a particular type of satellite operation, i.e., GEO, MEO or LEO. Access to more than one kind of satellite network needs two or more satellite modems, and an ability to switch between them as a user terminal (UT) moves between the different types of coverage. This has a number of disadvantages. For example, using multiple modems means increased space, power, weight, and thermal impacts on the platforms, especially in an aero environment. Moreover, performance enhancement features such as TCP/IP acceleration are typically handled in the modem. If more than one modem type is used, then handover between modems will not be able to maintain end-to-end TCP/IP connections. This has a negative impact on the user experience as the mobile platform switches between networks.

BRIEF SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A same satellite modem operates with Geostationary Earth-Orbit (GEO), Medium Earth-Orbit (MEO) and Low Earth-Orbit (LEO) satellites. The satellite modem has adaptations to maintain proper operation with each satellite type based on the motion of the modem, or the satellite, or both. For example, when operating with a LEO, MEO or GEO satellite, the modem uses adaptations for handling power, frequency, and timing variations that occur due to motion of the modem. However, when operating with a MEO or LEO satellite, the modem uses adaptations for handling power, frequency, and timing variations that occur due to motion of both the satellites and the modem. In some embodiments, a stationary mobility modem may use the present teachings to account for a motion of the satellites.

A system of one or more computers can be configured to perform particular operations or actions by virtue of having software, firmware, hardware, or a combination of them installed on the system that in operation causes or cause the system to perform a method. In one aspect, the method includes triggering synchronization of a satellite modem to a carrier frequency of a beam of a satellite, retrieving ephemeris information for the satellite and beam configuration information for the beam, calculating a velocity of the satellite per the ephemeris information, and adjusting the carrier frequency of the satellite modem when communicating via the beam to compensate for a doppler offset induced in the carrier frequency by the velocity. In the method, the satellite has a satellite type selected from a Geosynchronous Earth Orbit (GEO), Medium Earth Orbit (MEO) or Low Earth Orbit (LEO) type of satellite, and the satellite type is different than a satellite type of an immediately preceding synchronization.

In some embodiments, the method may include one or more of the following. The method may include synchronizing a timing of the communicating via the satellite modem to a gateway. The method may include synchronizing a transmit power of the transmitting from the satellite modem. The method where the adjusting further compensates for a UT movement induced doppler offset in the carrier frequency. The method where the adjusting further compensates for a velocity of the satellite relative to a gateway. The method may include directing an antenna controller to point an antenna to a real-time location of the satellite. The method may include repointing to a new satellite having a same satellite type as the satellite type. The method where the triggering includes one or more of receiving a message to synchronize, determining that the satellite modem is within a coverage area of the satellite, imminent arrival of the satellite modem into the coverage area of the satellite, and imminent departure of the satellite modem from a current coverage area. The method where the retrieving includes accessing an ephemeris repository via a satellite link to retrieve the ephemeris information. The method where the communicating includes receiving and transmitting. Other technical features may be readily apparent to one skilled in the art from the following figures, descriptions, and claims.

In one aspect, a computing apparatus includes a processor. The computing apparatus also includes a memory storing instructions that, when executed by the processor, configure the apparatus to trigger synchronization of a satellite modem to a carrier frequency of a beam of a satellite, retrieve ephemeris information for the satellite and beam configuration information for the beam, calculate a velocity of the satellite per the ephemeris information, and adjust the carrier frequency of the satellite modem when communicating via the beam to compensate for a doppler offset induced in the carrier frequency by the velocity, where the satellite has a satellite type selected from a Geosynchronous Earth Orbit (GEO), Medium Earth Orbit (MEO) or Low Earth Orbit (LEO) type of satellite, and the satellite type is different than a satellite type of an immediately preceding synchronization.

Additional features will be set forth in the description that follows, and in part will be apparent from the description, or may be learned by practice of what is described.

BRIEF DESCRIPTION OF THE SEVERAL VIEWS OF THE DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
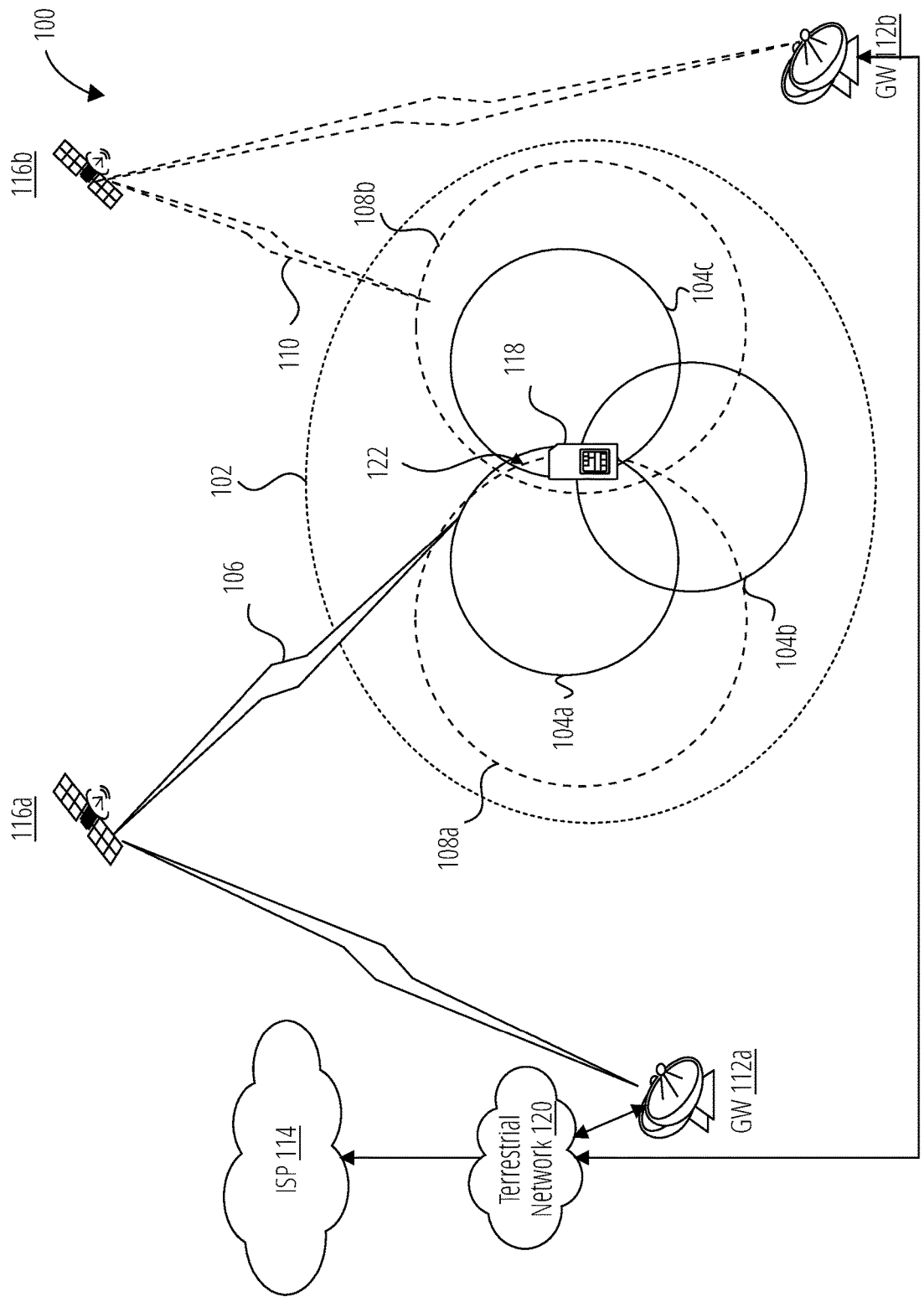
FIG. 1 illustrates an aspect of the subject matter in accordance with one embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Introduction

Providing GEO, MEO and LEO access to a stationery or moving platform, such as an aircraft, boat, or land-based vehicle, has a number of advantages. Coverage for a UT can be extended from a GEO network to a MEO or LEO network to provide communications access in areas beyond the reach of standard GEO networks. GEO networks are typically focused on providing land-based communications, and therefore do not typically provide coverage over water. Further, as GEO satellites are equatorially based, they do not provide good land or water coverage in high latitudes, in other words, near the poles. LEO and MEO constellations typically provide the same type of coverage over water as over land, and some of the constellations provide good quality polar coverage.

Mobile terminals tend to travel along well-defined routes, and also tend to congregate in clusters. As examples, aircraft fly along well-defined flight paths and congregate at airports, and ships travel well-defined sea lanes and congregate at ports. This creates high demand for satellite bandwidth in those areas. A UT that can access various satellite coverages allows a network operator to augment capacity in very specific areas, regardless of whether the primary access for a terminal is via a GEO, MEO or LEO constellation. For instance, a service provider could use a GEO satellite with wide area coverage of North America, and then augment this with MEO coverage around particularly busy airports such as those in Chicago, Atlanta, and Los Angeles. Conversely a maritime provider could provide over the water coverage using a MEO constellation, and then augment this with GEO coverage as ships enter a GEO coverage area.

The present teachings reduce power, thermal, and weight requirements compared to a multi-modem solution. In some embodiments, the present teachings provide seamless switching, including maintenance of end-to-end TCP/IP connections when moving between satellite networks. A common gateway infrastructure may be used for the LEO, MEO and GEO networks based on the use of a single modem type on a platform, for example, a mobile platform.

The present teachings use the same satellite modem to operate with GEO, MEO and LEO satellites. The satellite modem has adaptations to maintain proper operation with each satellite type based on the motion of the modem, or the satellite, or both. For example, when operating with a GEO satellite, the modem uses adaptations for handling power, frequency, and timing variations that occur due to motion of the modem. However, when operating with a MEO or LEO satellite, the modem uses adaptations for handling power, frequency, and timing variations that occur due to motion of both the satellites and the modem. In some embodiments, a stationary mobility modem may use the present teachings to account for a motion of the satellites.

In LEO and MEO operation, the size of the variations in timing and frequency can be much larger than in GEO operation. The modem handles these additional variations with no change in hardware, software, or firmware required as the modem transitions between GEO, MEO and LEO modes. In some embodiments, the modem performs satellite and beam switch operations in a short duration regardless of which type of satellites are involved. The short duration may be less than 30 seconds, less than 20 seconds, less than 10 seconds, less than 5 seconds, less than 2 seconds or the like. The transition duration does not include antenna related delays such as a physical antenna repoint, local oscillator update, or the like. In some embodiments, end-to-end TCP/IP sessions can be maintained by connectivity via a common data center to minimize disruptions to user traffic during modem transitions.

Additionally, the modem may include beam selection. For example, satellite beam selection may be based on a modem's geolocation, and a relative direction and rate of travel between the modem and the satellite. The transitioning from one beam to another may be performed while the modem is moving. In some embodiments, the modem may consider beam movement across the surface of the earth due to the motion of the satellite (for example, MEO or LEO satellites) affecting the modem position within a beam. In some embodiments, the modem may consider the need to switch satellites as each satellite in the constellation passes over.

In some embodiments, the modem may receive LEO or MEO ephemeris information. In some embodiments, ephemeris information may be broadcast over the satellite constellations. In some embodiments, an ephemeris data server may be accessed over a satellite when coverage from the satellite is available. In other embodiments, ephemeris information may be provided by equipment connected locally to the modem via a LAN or other physical interface, whether pushed by the local equipment or pulled by the modem. In some embodiments, modem may be provisioned with some ephemeris data.

The modem may be provided beam configuration information to define the characteristics of all satellite beams in the coverage area. The beam configuration information may include geographical boundaries, satellite type (GEO/MEO/LEO), outroute carrier information, inroute carrier information and the like. For GEO beams, the beam configuration information may include satellite coordinates in the GEO arc. For MEO beams the beam configuration information may include adjustments based on a Satellite local oscillator (LO) in the return direction and a gateway (GW) geolocation. In some embodiments, the position of the beams on the earth's surface may be fixed. The beam configuration information may be provided in a file or the like.

The modem can perform functions appropriate to GEO or MEO type based on the beam configuration information. For each beam type the modem calculates the doppler offset induced in the modem's transmit carrier due to the movement of the UT. For GEO beam types the modem then applies a corresponding offset in the opposite direction to the transmit carrier generated by the modem so that the carrier leaves the vehicle at the correct frequency.

For MEO and LEO beams, the modem also calculates Doppler induced due to a motion of the satellite. The modem processes satellite ephemeris data to compute in real time the specific satellite ID that is putting up the beam, as well as the satellite's coordinates. The Modem uses own location, satellite location and GW location to compute relative velocity of two links in the return direction, between the Modem and the Satellite and between the Satellite and the GW. The modem uses Satellite LO to compute Satellite to GW link's frequency from its own return link frequency in use. The modem computes Doppler for each of these links, adds in the Doppler shift due to the vehicle motion and shifts its Tx carrier frequency to compensate for the total Doppler experienced from Modem to GW.

The Modem directs the Antenna Controller when it is in a LEO/MEO beam and provides real time satellite location for the Antenna Controller to point an antenna to the satellite. When a switch from a first LEO/MEO satellite to a second LEO/MEO satellite is needed, the Modem sends control information to the Antenna Controller to repoint while in a LEO/MEO beam of the first LEO/MEO satellite. After the repointing, the Modem may trigger Tx link resynchronization for timing and power due to the switch in satellites. Further, the modem accounts for Satellite specific offset to the base LO in the return direction. In some embodiments, switching time between satellites maybe minimized by using a make-before-break scheme (obtain lock with new satellite prior to breaking lock with old satellite), by for example, using multiple directional antennas with the antenna controller.

FIG. 1 illustrates an exemplary satellite network according to various embodiments.

The Satellite network 100 includes a coverage area 102, GWs 112a, a satellite s1 116a, a UT 118, a Terrestrial Network 120 and an ISP 114 (internet service point). The GWs 112a can service a s1 cell 104a, a s1 cell 104b, a s1 cell 104c with s1 beams 106. Different s1 beams 106 may be served by different GWs 112a. When the UT 118 is disposed in or imminently arriving in an overlap 122 of two or more cells, for example s1 cell 104a and s1 cell 104b, a beam switch between respective beams of the service areas may be initiated. A beam switch between service areas of a common satellite may need a switch of gateways also.

The coverage area 102 may also be served a satellite s2 116b servicing a s2 cell 108a and a s2 cell 108b with s2 beams 110 using GWs 112b. GWs 112a and GWs 112b may be connected via the Terrestrial Network 120. The overlap 122 may be between a s1 cell and an s2 cell, for example, s1 cell 104a and s2 cell 108b. In such an overlap, the beam switch may switch satellites that needs a switch of gateways also. The GWs 112a and GWs 112b may provide UTs 118 with internet access via the ISP 114. The satellite s1 116a and satellite s2 116b may be of different satellite types, for example, GEO, LEO or MEO.

Figure 2:
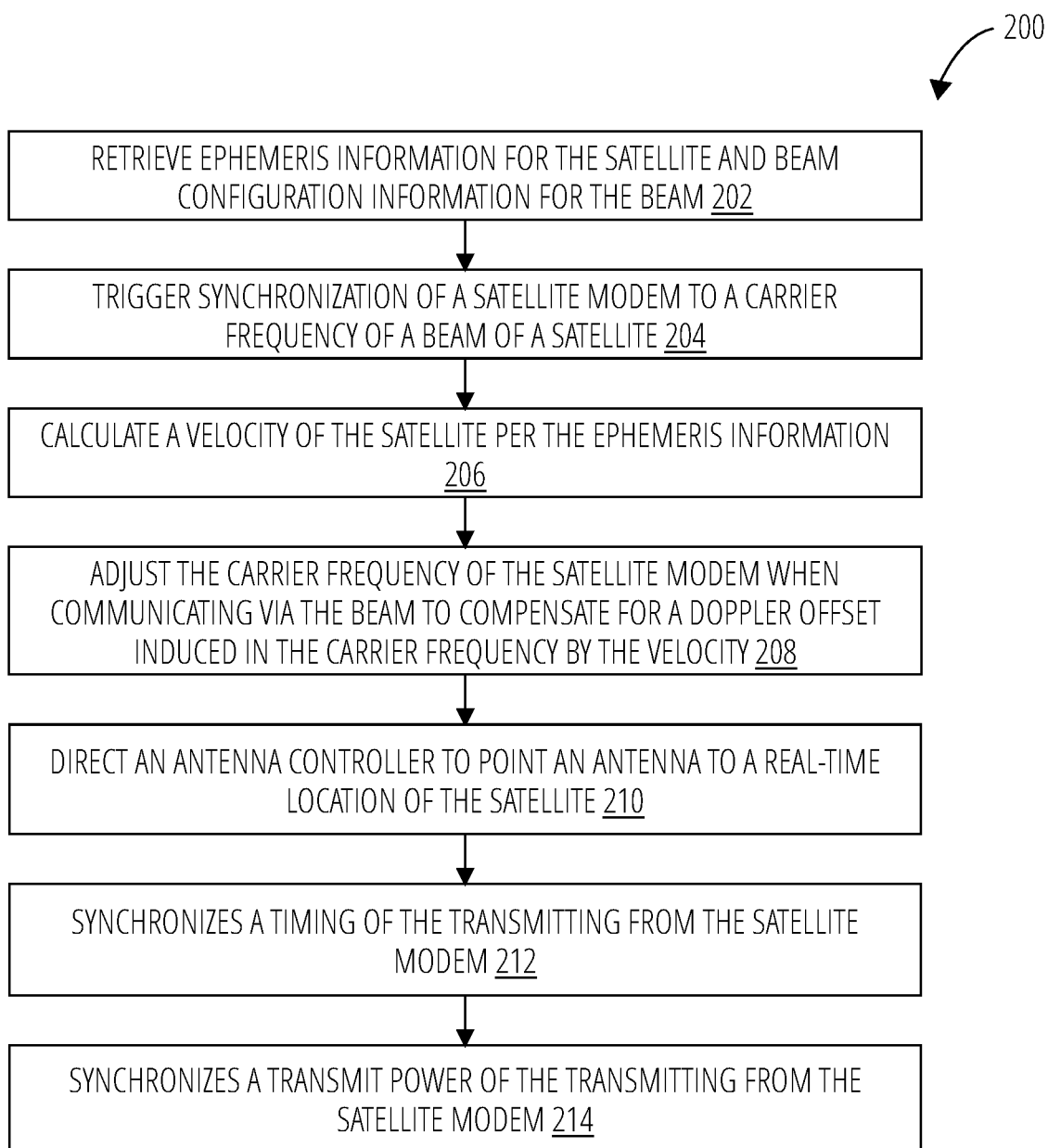
FIG. 2 illustrates a method for connecting a modem to various satellite types according to various embodiments.

FIG. 2 illustrates a method for connecting a modem to various satellite types according to various embodiments.

In operation 202, method 200 retrieves ephemeris information for the satellite and beam configuration information for the beam. In operation 204, method 200 triggers synchronization of a satellite modem to a carrier frequency of a beam of a satellite. In operation 206, method 200 calculates a velocity of the satellite per the ephemeris information. In operation 208, method 200 adjusts the carrier frequency of the satellite modem when communicating via the beam to compensate for a doppler offset induced in the carrier frequency by the velocity. In method 200 the satellite has a satellite type selected from a Geosynchronous Earth Orbit (GEO), Medium Earth Orbit (MEO) or Low Earth Orbit (LEO) type of satellite, and the satellite type is different than a satellite type of an immediately preceding synchronization.

In operation 210, method 200 directs an antenna controller to point an antenna to a real-time location of the satellite. In operation 212, method 200 synchronizes a timing of the communicating via the satellite modem to a gateway. In operation 214, method 200 synchronizes a transmit power of the transmitting from the satellite modem.

Figure 3:
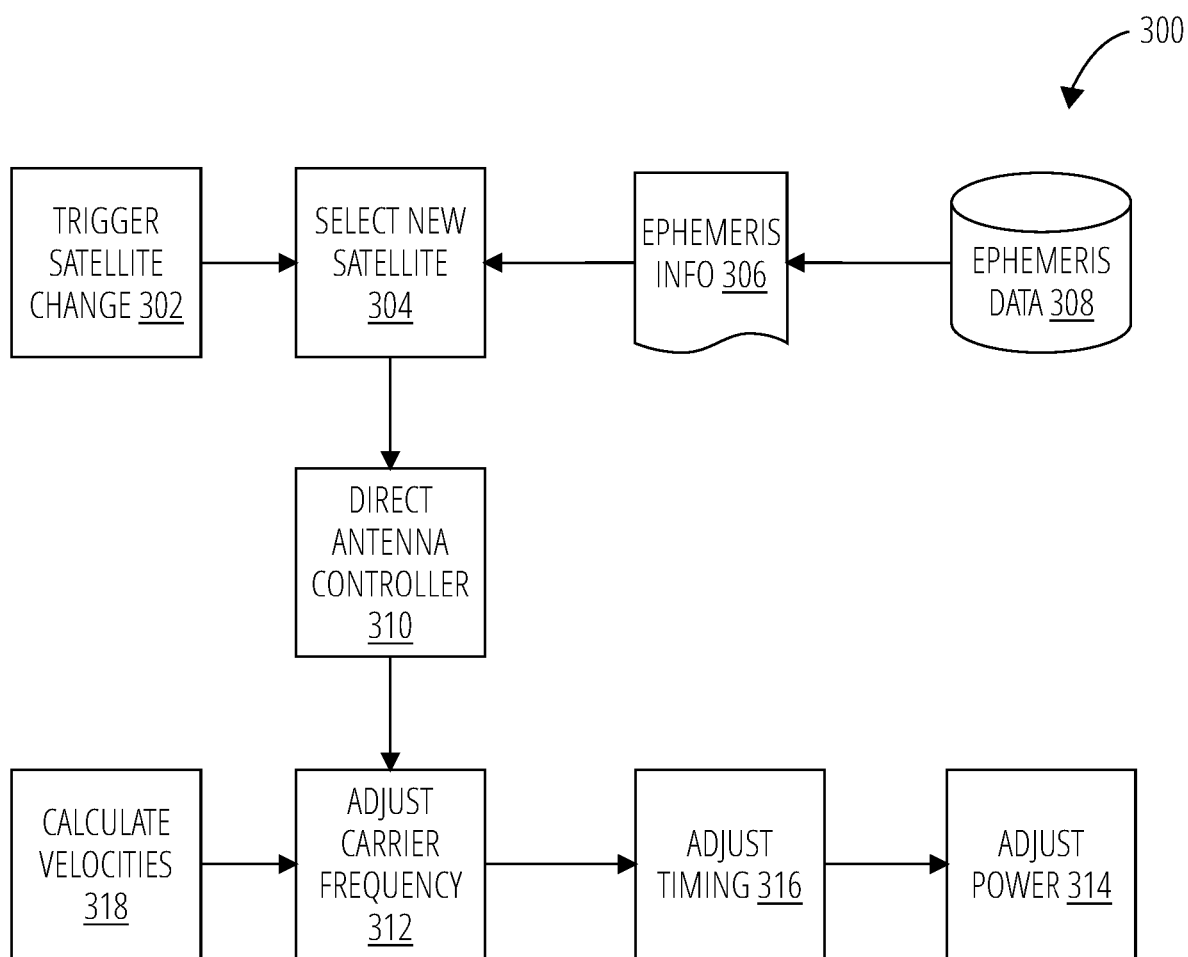
FIG. 3 illustrates an aspect of the subject matter in accordance with one embodiment.

FIG. 3 illustrates an aspect of the subject matter in accordance with one embodiment.

The system 300 includes various modules including a Trigger Satellite Change 302, a Select New Satellite 304, an Ephemeris info 306, an Ephemeris data 308, a Direct Antenna Controller 310, an Adjust Carrier Frequency 312, an Adjust power 314, an Adjust Timing 316, and a Calculate Velocities 318 module.

An external or internal event to the system 300 may invoke Trigger Satellite Change 302 due to an impending arrival into or departure from a coverage area, for example. Trigger Satellite Change 302 then establishes a beam lock (inroute or outroute) with Select New Satellite 304. Select New Satellite 304 uses Ephemeris info 306 and Ephemeris data 308 to Direct Antenna Controller 310 to aim at the selected new satellite. Once Direct Antenna Controller 310 operation is complete, Adjust Carrier Frequency 312, Adjust Timing 316 and Adjust power 314 operations can be performed. Adjust Carrier Frequency 312 uses Calculate Velocities 318 to calculate one or more of a UT velocity, a selected new satellite velocity and a relative velocity between the UT and the selected new satellite.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method comprising:
triggering synchronization of a satellite modem to a carrier frequency of a beam of a satellite;
retrieving an ephemeris information for the satellite and a beam configuration information for the beam;
calculating a velocity of the satellite per the ephemeris information; and
adjusting a carrier frequency of the satellite modem when communicating via the beam to compensate for a doppler offset induced in the carrier frequency by the velocity,
wherein the satellite modem is capable of communicating with a Geosynchronous Earth Orbit (GEO), Medium Earth Orbit (MEO) and Low Earth Orbit (LEO) type of satellite.

2. The method of claim 1, further comprising synchronizing a timing of the communicating via the satellite modem to a gateway.

3. The method of claim 1, further comprising synchronizing a transmit power of the transmitting from the satellite modem.

4. The method of claim 1, wherein the adjusting further compensates for a UT movement induced doppler offset in the carrier frequency.

5. The method of claim 1, wherein the adjusting further compensates for a velocity of the satellite relative to a gateway.

6. The method of claim 1, further comprising directing an antenna controller to point an antenna to a real-time location of the satellite.

7. The method of claim 1, further comprising repointing to a new satellite having a same satellite type as the satellite type.

8. The method of claim 1, wherein the triggering comprises one or more of receiving a message to synchronize, determining that the satellite modem is within a coverage area of the satellite, imminent arrival of the satellite modem into the coverage area of the satellite, and imminent departure of the satellite modem from a current coverage area.

9. The method of claim 1, wherein the retrieving comprises accessing an ephemeris repository via a satellite link to retrieve the ephemeris information.

10. The method of claim 1, wherein the communicating comprises receiving and transmitting.

11. A computing apparatus comprising:
a processor; and
a memory storing instructions that, when executed by the processor, configure the apparatus to:
trigger synchronization of a satellite modem to a carrier frequency of a beam of a satellite;
retrieve an ephemeris information for the satellite and a beam configuration information for the beam;
calculate a velocity of the satellite per the ephemeris information; and
adjust a carrier frequency of the satellite modem when communicating via the beam to compensate for a doppler offset induced in the carrier frequency by the velocity,
wherein the satellite modem is capable of communicating with a Geosynchronous Earth Orbit (GEO), Medium Earth Orbit (MEO) and Low Earth Orbit (LEO) type of satellite.

12. The computing apparatus of claim 11, wherein the instructions further configure the apparatus to synchronize a timing of the communicating via the satellite modem to a gateway.

13. The computing apparatus of claim 11, wherein the instructions further configure the apparatus to synchronize a transmit power of the transmitting from the satellite modem.

14. The computing apparatus of claim 11, wherein the adjusting further compensates for a UT movement induced doppler offset in the carrier frequency.

15. The computing apparatus of claim 11, wherein the adjusting further compensates for a velocity of the satellite relative to a gateway.

16. The computing apparatus of claim 11, wherein the instructions further configure the apparatus to direct an antenna controller to point an antenna to a real-time location of the satellite.

17. The computing apparatus of claim 11, wherein the instructions further configure the apparatus to repoint to a new satellite having a same satellite type as the satellite type.

18. The computing apparatus of claim 11, wherein the triggering comprises one or more of receiving a message to synchronize, determine that the satellite modem is within a coverage area of the satellite, imminent arrival of the satellite modem into the coverage area of the satellite, and imminent departure of the satellite modem from a current coverage area.

19. The computing apparatus of claim 11, wherein the retrieving comprises access an ephemeris repository via a satellite link to retrieve the ephemeris information.

20. The computing apparatus of claim 11, wherein the communicating comprises receive and transmitting.

* * * * *